US012244885B2

(12) United States Patent
Merchant (10) Patent No.: US 12,244,885 B2
(45) Date of Patent: Mar. 4, 2025

(54) PERSONALIZED CONTENT RELATED TO CONTENT BEING VIEWED (71) Applicant: Roku, Inc., San Jose, CA (US)

(72) Inventor: Shashank Merchant, Emeryville, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/364,169

(22) Filed: Aug. 2, 2023

(65) Prior Publication Data

US 2025/0047924 A1 Feb. 6, 2025

(51) Int. Cl.
*H04N 21/2668* (2011.01)
*H04N 21/234* (2011.01)
*H04N 21/25* (2011.01)
*H04N 21/258* (2011.01)
*H04N 21/431* (2011.01)

(52) U.S. Cl.
CPC ... *H04N 21/2668* (2013.01); *H04N 21/23418* (2013.01); *H04N 21/251* (2013.01); *H04N 21/25891* (2013.01); *H04N 21/431* (2013.01)

(58) Field of Classification Search
CPC ......... H04N 21/2668; H04N 21/23418; H04N 21/251; H04N 21/25891; H04N 21/431
See application file for complete search history.

(56) References Cited

U.S. PATENT DOCUMENTS

2019/0132654 A1* 5/2019 Hu .................. H04N 21/8586

* cited by examiner

*Primary Examiner* — Anthony Bantamoi
(74) *Attorney, Agent, or Firm* — Sterne, Kessler, Goldstein & Fox P.L.L.C.

(57) ABSTRACT

Provided herein are system, apparatus, article of manufacture, method and/or computer program product, and/or combinations and sub-combinations thereof, for utilizing a personalized content system to enhance an effectiveness of content being shown to the user via personalized content associated with the content. This method allows the platform to present the most relevant personalized in-channel content to the users, in a user interface, which then correspondingly helps drive user interest. This method scans content to identify objects of interest located within the content, generates a query based on the identified objects of interest and a user profile, searches content sources for related content, associates the related content with an occurrence of a corresponding identified object of interest within the content and communicates, to the user device, the content and the related content for instantiation through a user interface of the user device.

20 Claims, 7 Drawing Sheets

PERSONALIZED CONTENT RELATED TO CONTENT BEING VIEWED

BACKGROUND

Field

This disclosure is generally directed to creation of personalized content, and more particularly to providing personalized content related to content being viewed.

Summary

Provided herein are system, apparatus, article of manufacture, method and/or computer program product, and/or combinations and sub-combinations thereof, for utilizing a personalized content system to enhance an effectiveness of content being shown to the user via personalized content associated with the content. This method allows the platform to present the most relevant personalized in-channel content to the users in a user interface, which then correspondingly helps drive user interest.

An example aspect operates by generating related content based a user's profile, one or more recognized features of the current content and an Artificial Intelligence (AI) generated query to a related content database.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product aspects, and/or combinations and sub-combinations thereof, for utilizing a personalized content system to enhance an effectiveness of content being shown to the user via personalized information associated with the content.

Figure 1:
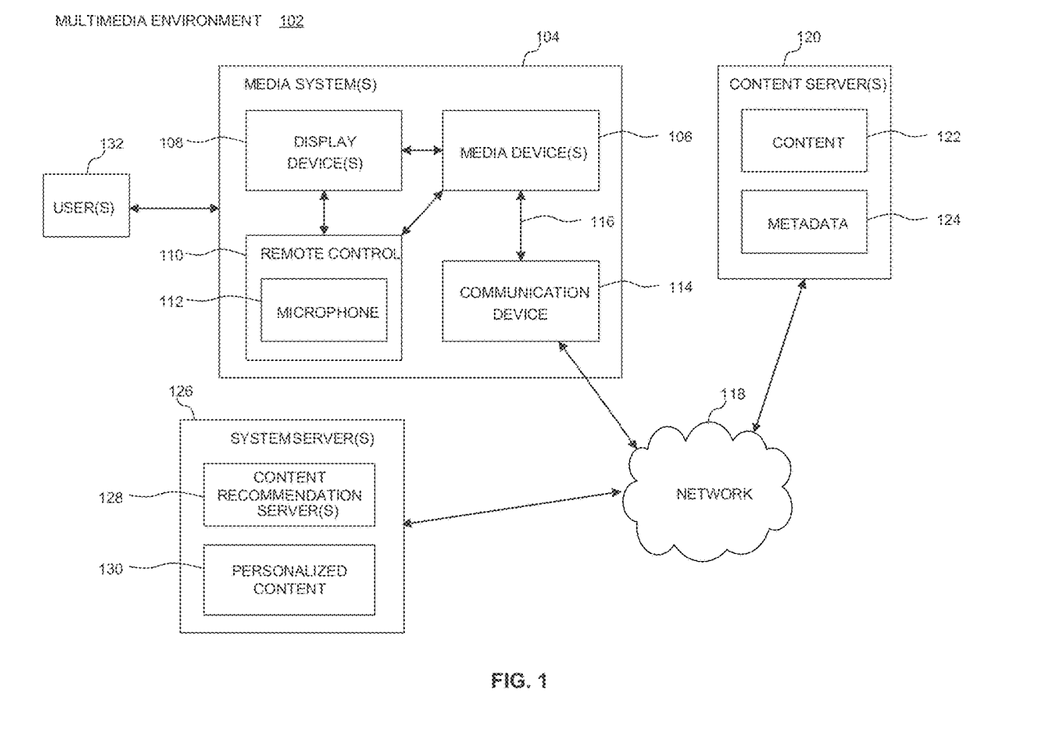
FIG. 1 illustrates a block diagram of a multimedia environment, according to some aspects.

Various aspects of this disclosure may be implemented using and/or may be part of a multimedia environment 102 shown in FIG. 1. It is noted, however, that multimedia environment 102 is provided solely for illustrative purposes, and is not limiting. Aspects of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some aspects. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein. For example, media systems may be implemented in mobile device environments.

Media device 106 may be a streaming media device, DVD or BLU-RAY device, audio/video playback device, cable box, voice assistant, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some aspects, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various aspects, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, services or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some aspects, metadata 124 comprises data about content 122. For example, metadata 124 may include associated or ancillary information indicating or related to writer, director, producer, composer, artist, actor, singer, summary, chapters, production, history, year, trailers, alternate versions, related content, applications, objects of interest located within the content, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to content enhancement aspects and, thus, the system servers 126 may include one or more servers processing personalized content 130. In some aspects, the media device 106 may display the personalized content 130 in the media system 104, such as on the display device 108. In some aspects, the personalized data may further include advertising content.

In addition, using information received from the media devices 106 in the thousands and millions of media systems 104, content recommendation server(s) 128 may identify viewing habits, for example, preferences or likes for different users 132 watching a particular movie. Based on such information, the content recommendation server(s) 128 may determine that users with similar watching habits may be interested in watching similar content.

The system servers 126 may also include an audio server (not shown). In some aspects, the audio data received by the microphone 112 in the remote control 110 is transferred to the media device 106, which is then forwarded to the system servers 126 to process and analyze the received audio data to recognize the user 132's verbal command. The system servers 126 may then forward the verbal command back to the media device 106 for processing.

Figure 2:
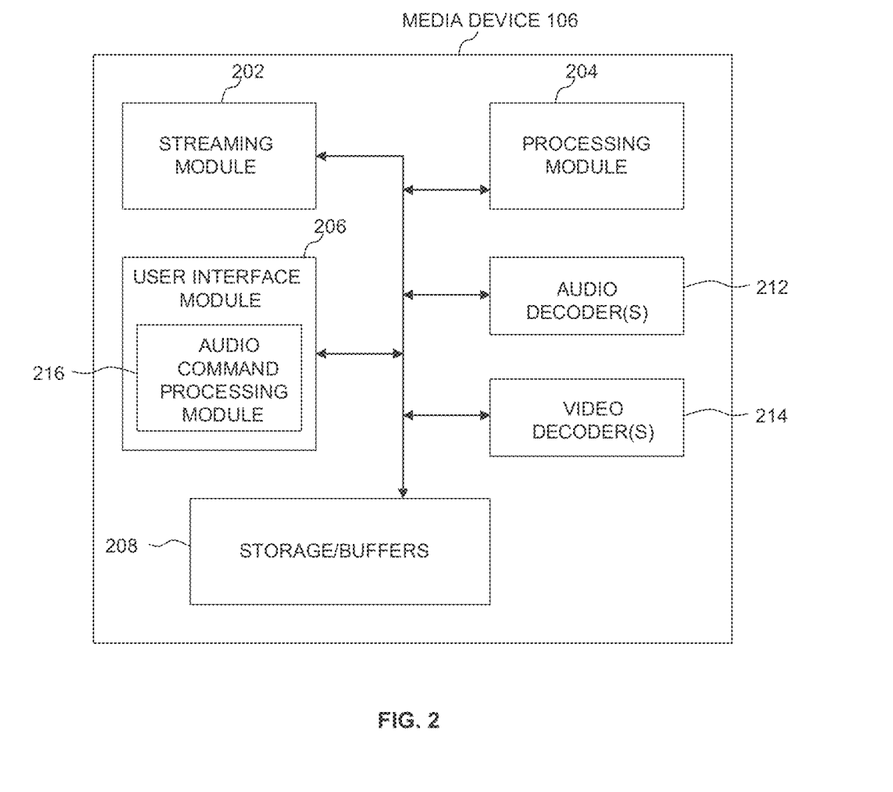
FIG. 2 illustrates a block diagram of a streaming media device, according to some aspects.

In some aspects, the personalized content 130 may be converted to audio data by one or more audio decoders (e.g., FIG. 2, audio decoder(s) 212) and provided to the media device 106 or display device 108.

In some aspects, the audio data may be alternatively or additionally processed and analyzed by an audio command processing module 216 in the media device 106 (see FIG. 2). The media device 106 and the system servers 126 may then cooperate to pick one of the verbal commands to process in the system servers 126, or the verbal command recognized by the audio command processing module 216 in the media device 106).

FIG. 2 illustrates a block diagram of an example media device 106, according to some aspects. Media device 106 may include a streaming module 202, processing module 204, storage/buffers 208, and user interface module 206. As described above, the user interface module 206 may include the audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some aspects, the user 132 may interact with the media device 106 via, for example, the remote control 110. For example, the user 132 may use the remote control 110 to interact with the user interface module 206 of the media device 106 to select content, such as, but not limited to, a video, movie, TV show, music, audio, text, book, application(s), game(s), historical description(s), etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming aspects, the streaming module 202 may transmit the content to the display device 108 in real time or near real time as it receives such content from the content server(s) 120. In non-streaming aspects, the media device 106 may store the content received from content server(s) 120 in storage/buffers 208 for later playback on display device 108.

Personalized Content Based on User Profile, Content Metadata and UI Queries of Related Content.

Referring to FIG. 1, the media devices 106 may exist in thousands or millions of media systems 104. Accordingly, the media devices 106 may lend themselves to personalized content solution aspects. In some aspects, an over-the-top (OTT) media device or service may benefit from the aspects disclosed herein. An OTT media service is a media service offered directly to viewers via the Internet. OTT bypasses cable, broadcast, and satellite television platforms; the types of companies that traditionally act as controllers or distributors of such content. The term is most synonymous with subscription-based video-on-demand (SVOD) services that offer access to film and television content (including existing series acquired from other producers, as well as original content produced specifically for the service). While described below for OTT devices, the technology described herein is not limited thereto. For example, the technology is applicable to content provided by cable and satellite providers without departing from the scope of the aspects disclosed herein.

OTT also encompasses a wave of "skinny" television services that offer access to live streams of linear specialty channels, similar to a traditional satellite or cable TV provider, but streamed over the public Internet, rather than a closed, private network with proprietary equipment such as set-top boxes. OTT services are typically accessed via websites on personal computers, as well as via apps on mobile devices (such as smartphones and tablets), digital media players (including video game consoles), or televisions with integrated Smart TV platforms.

However, personalization of endemic media on OTT devices has been difficult for several reasons. Endemic media works by placing, or allowing another business to place content that appeals directly to the interests of customers. However, known approaches may not solve the last mile problem of showing the best, most accurate content-based personalization that the user is likely to interact with.

In various aspects, the technology described herein implements a system, apparatus, article of manufacture, method and/or computer program product aspects, and/or combinations and sub-combinations thereof, for providing personalized content in addition to the content being shown to the user. This method allows the platform to present the most relevant personalized in-channel content to users in, for example, rendering additional on-screen content that runs on the platform, which then correspondingly helps drive user satisfaction.

As will be described in greater detail hereafter, in various aspects, the technology described herein implements a system, apparatus, article of manufacture, method and/or computer program product aspects, and/or combinations and sub-combinations thereof, for providing personalized content based on any of a user's profile, one or more recognized features of the current content, an AI generated query to search for related content and a UI to present the related content to the user.

Figure 3:
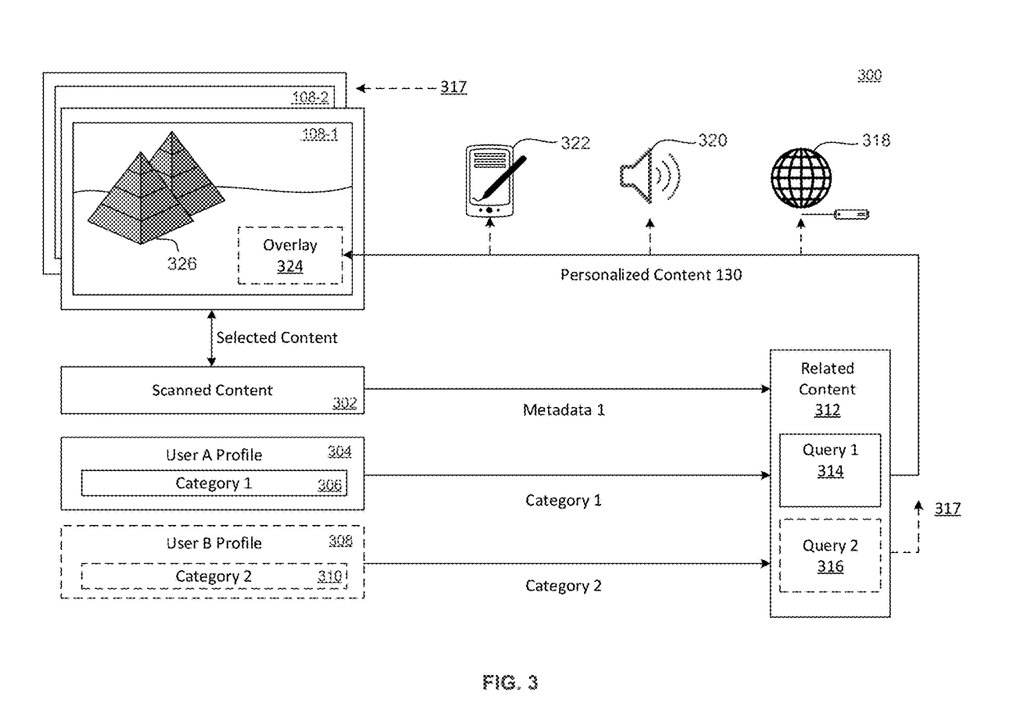
FIG. 3 illustrates an example diagram of a personalized content system, according to some aspects.

FIG. 3 illustrates an example diagram of a personalized content system 300, according to some aspects. Operations described may be implemented by processing logic that can comprise hardware (e.g., circuitry, dedicated logic, programmable logic, microcode, etc.), software (e.g., instructions executing on a processing device), or a combination thereof. In various aspects, scanning and metadata generation features described throughout may be performed on either a client device (e.g., media devices 106) or a server (e.g., content servers 120, system servers 126, etc.). It is to be appreciated that not all operations may be needed to perform the disclosure provided herein. Further, some of the operations may be performed simultaneously, or in a different order than described for FIG. 3, as will be understood by a person of ordinary skill in the art.

Personalized content system 300 may be implemented with a content recommendation server 128. Alternatively, or in addition to, one or more components of the personalized content system may be implemented within the media system 104, by third party platforms, a cloud-based system or distributed across multiple computer-based systems. For example, the related content may be sourced from online databases, media sources, libraries, research sources, scientific sources, social media, to name a few.

In an example of personalized content 130, User A and User B are watching a movie that is set in Egypt on display device 108-1. Alternatively, User A and User B watch the same movie on separate display devices 108-1 and 108-2.

The movie represents example content that may be streamed and displayed on display device(s) 108-1 and 108-2. In one aspect, this content may be scanned for identifiable objects of interest. These identifiable objects of interest may be places, products and people, to name a few. While described below for historical type content objects, any identifiable aspect of content may be scanned for. For example, these identifiable objects of interest may be a historical location, such as a known tourist spot, an historical object, and an historical event, to name a few. In this example, when the pyramids 326 appear in the content, various identifying metadata may be generated by a content scanner (FIG. 4, content scanner 408) to produce the scanned content 302. In this scenario, metadata of these identifiable objects of interest may be "pyramids", "Egyptian pyramids", "specific named pyramids", "pyramid location(s)", to name a few.

This metadata is communicated to a source of additional related information (i.e., related content) as a query that may be derived from an analysis of the metadata and additional information about the user. For example, User A has an established persona in their user profile 304 of a tourist (e.g., shown as "Category 1" 306), while User B has an established persona in their user profile 308 of an historian (e.g., shown as "Category 2" 310). Query 1 (314) may combine the metadata 1 "Egyptian pyramid(s)" with user A's persona, noted as category 1, into a query of Egyptian pyramids consistent with a tourist. Query 2 (316) may combine the metadata 1 "Egyptian pyramid(s)" with user B's persona, noted as category 2, into a query of Egyptian pyramids consistent with a history buff. These queries may be used to search for related content 312 located in content server(s) 120 or other digital content source.

Personas may include, but are not limited to, traditional profile likes and dislikes related to historically viewed content, hobbies, occupational related interests, social interests, audio personas, such as an affinity to a type of music, or musical artist or group, to name a few.

An example, a simple query for User A might be "travel to the Egyptian pyramids". While, a simple query for User B might be "history of the Egyptian pyramids". While described with simple queries for ease of understanding, as described in greater detail hereafter, the queries may be complex queries generated by various combinations of weighted metadata and natural language processing elements, such as queries generated by ML models or AI chatbot processes.

In this example, when the pyramids 326 appear in the content, users are notified on the screen that there is more info available (e.g., personalized content). In various aspects, the notification may be visual or aural (video, audio, text, links, etc.). The user may interact with the additional info by selecting with remote control 110, manual input request (e.g., keyboard, mouse input, touch screen, etc.) or by voice command inputs (e.g., audio command processing module 216). The personalized content 130 may subsequently be distributed to media device 106 (e.g., mobile computing device 322) or to a display device (e.g., 108-1 or 108-2). In various aspects, the personalized content may be distributed as a Web link/Web page 318, as audio 320, or as a graphic overlay 324. However, depending on the user's profile, different personalized information is generated for the user.

Following the above example, User A (Tourist), may receive personalized content 130, such as, "The Pyramids of Egypt are one of the most iconic and recognizable tourist attractions in the world. These ancient structures were built more than 4,000 years ago, and they continue to attract millions of visitors each year. The Pyramids are located on the outskirts of Cairo, Egypt's capital city, and they are the last surviving wonder of the ancient world. The Great Pyramid of Giza is the largest of the three pyramids and is considered the oldest and most famous. Visitors to the Pyramids can explore the ancient tombs of the pharaohs, which are located inside the pyramids. They can also see the impressive Sphinx, a statue of a mythical creature with the head of a human and the body of a lion. Tourists can learn about the history of the pyramids at the nearby Egyptian Museum, which houses a vast collection of artifacts from ancient Egyptian times. There are also opportunities to take camel rides through the desert and watch traditional Egyptian performances. Overall, the Pyramids of Egypt are a must-see destination for any tourist interested in ancient history and architecture. Their grandeur and mystery continue to fascinate visitors from around the world."

However, User B (History buff), may receive different personalized content 130, further identified as element 317, such as, "The pyramids of Egypt are monumental structures that were built during the Old Kingdom period of ancient Egyptian history, which lasted from approximately 2686 BC to 2181 BC. The pyramids served as tombs for the pharaohs and their consorts and were constructed using massive stone blocks, primarily limestone and granite. The most famous pyramids are the three pyramids of Giza, located on the outskirts of modern-day Cairo. The Great Pyramid of Giza, built for the pharaoh Khufu, is the largest of the three, standing over 450 feet tall and containing more than two million stone blocks weighing up to 80 tons each. The other two pyramids at Giza were built for Khufu's successors, Khafre and Menkaure, respectively. The construction of the pyramids involved complex engineering techniques and organization, with tens of thousands of workers involved in their construction. The pyramids were designed to align with the stars and were oriented to face true north with remarkable accuracy. Researchers continue to study the pyramids in order to better understand how they were built, how they functioned, and what they can tell us about ancient Egyptian culture and society. Some of the key research questions surrounding the pyramids include their construction methods, the logistics of feeding and housing the workers who built them, the role of the pyramids in the afterlife beliefs of the ancient Egyptians, and the symbolism and iconography found within the pyramids and other related structures. Overall, the pyramids of Egypt represent one of the most impressive engineering and architectural feats of human history, and they continue to inspire awe and fascination among researchers and the general public alike."

In some aspects, a frequency cap may be implemented preventing a repeat of personalized content 130. For example, the personalized content 130 is presented to the user on a first occurrence of the object of interest. Alternatively, or in addition to, the personalized content feature may be selectively turned ON/OFF.

Figure 4:
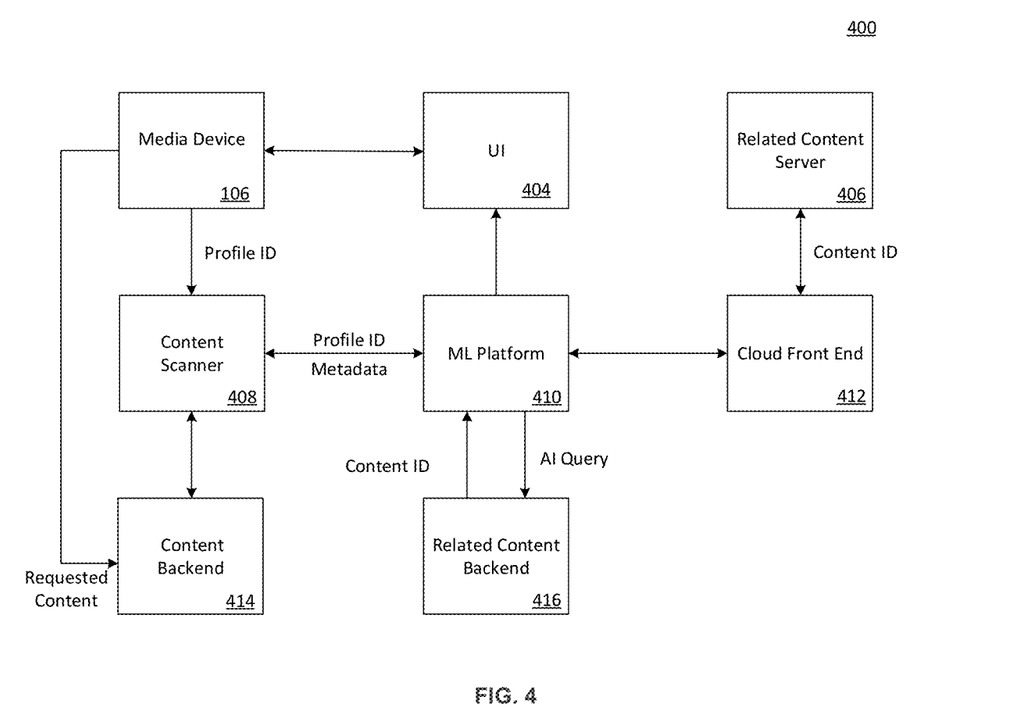
FIG. 4 illustrates another example diagram of a personalized content system, according to some aspects.

FIG. 4 illustrates another example diagram of a personalized content system 400, according to some aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

In some aspects, media device 106 requests content from content backend 414. In some configurations, content backend 414 implements functionality associated with a content recommendation server 128. For example, the media device 106 requests may be selections from previously recommended content. A content recommender system, or a content recommendation system, is a subclass of information filtering system that seeks to predict the "rating" or "preference" a user would give to an item. The aspects described herein may use any content recommendation system, algorithm or models without departing from the scope of the technology described herein. A few commonly used systems will be described hereafter, but other approaches, including future approaches may be interchanged herein without departing from the scope of the technology described.

Content recommendation systems are used in a variety of areas, with commonly recognized examples taking the form of playlist generators for movies, series, documentaries, podcasts, music services, and product recommendations, to name a few. In some aspects, the playlist may be instantiated as a series of visual tiles displaying a sample image of the content or selectable movie trailer. The tiles may be arranged by some selected ordering system (e.g., popularity) and may be arranged in groups or categories, such as "trending", "top 10", "newly added", "sports", "action", etc.

One approach to the design of recommender systems that has wide use is collaborative filtering. Collaborative filtering is based on the assumption that people who agreed in the past will agree in the future, and that they will like similar kinds of items as they liked in the past. The system generates recommendations using only information about rating profiles for different users or items. By locating peer users/items with a rating history similar to the current user or item, they generate recommendations using this neighborhood. Collaborative filtering methods are classified as memory-based and model-based. A well-known example of memory-based approaches is the user-based algorithm, while that of model-based approaches is the Kernel-Mapping Recommender.

Another common approach when designing recommender systems is content-based filtering. Content-based filtering methods are based on a description of the item and a profile of the user's preferences. These methods are best suited to situations where there is known data on an item (name, location, description, etc.), but not on the user. Content-based recommenders treat recommendation as a user-specific classification problem and learn a classifier for the user's likes and dislikes based on an item's features.

In this system, keywords are used to describe the items, and a user profile is built to indicate the type of item this user likes. In other words, these algorithms try to recommend items similar to those that a user liked in the past or is examining in the present. It does not rely on a user sign-in mechanism to generate this often-temporary profile. In particular, various candidate items are compared with items previously rated by the user, and the best-matching items are recommended. In some aspects, the system may ask the user about his/her preference from one or more categories.

In some approaches, these various methods may use an item profile (i.e., a set of discrete attributes and features) characterizing the item within the system. To abstract the features of the items in the system, an item presentation algorithm is applied. A widely used algorithm is the tf-idf representation (also called vector space representation). The system creates a content-based profile of users based on a weighted vector of item features. The weights denote the importance of each feature to the user and can be computed from individually rated content vectors using a variety of techniques. Simple approaches use the average values of the rated item vector while other sophisticated methods use machine-learning techniques such as Bayesian Classifiers, cluster analysis, decision trees, and artificial neural networks in order to estimate the probability that the user is going to like the item.

The aspects described herein may use any content recommendation system, algorithm or models without departing from the scope of the technology described herein. Other content recommendation approaches, including future approaches may be interchanged herein without departing from the scope of the technology described.

The following descriptions are directed to real-time processing of the content, but one or more, or all of the steps, may be performed in advance by a content provider, content distributor, third party vendor, content recommendation server 128 or any other content source without departing from the scope of the technology described herein. For example, a content provider may scan their content and generate descriptive metadata of objects of interest located in the content.

Content scanner 408, in various aspects, scans the content, such as live content, using known or future systems and algorithms, such as, but not limited to, Automatic Content Recognition (ACR), Ad Based Video on Demand (AVOD), Subscription VOD (SVOD), Online Video Platform (OVP), or Over-The-Top platform (OTT) to identify the objects of interest, such as, but limited to, landmarks, products, people, sounds, etc.) and an exact timing within the content for showing the information. The results may include one or more descriptive metadata. Each metadata associated with the object of interest is associated with one or more timestamps indicating when in the content stream the object of interest occurs.

Figure 5:
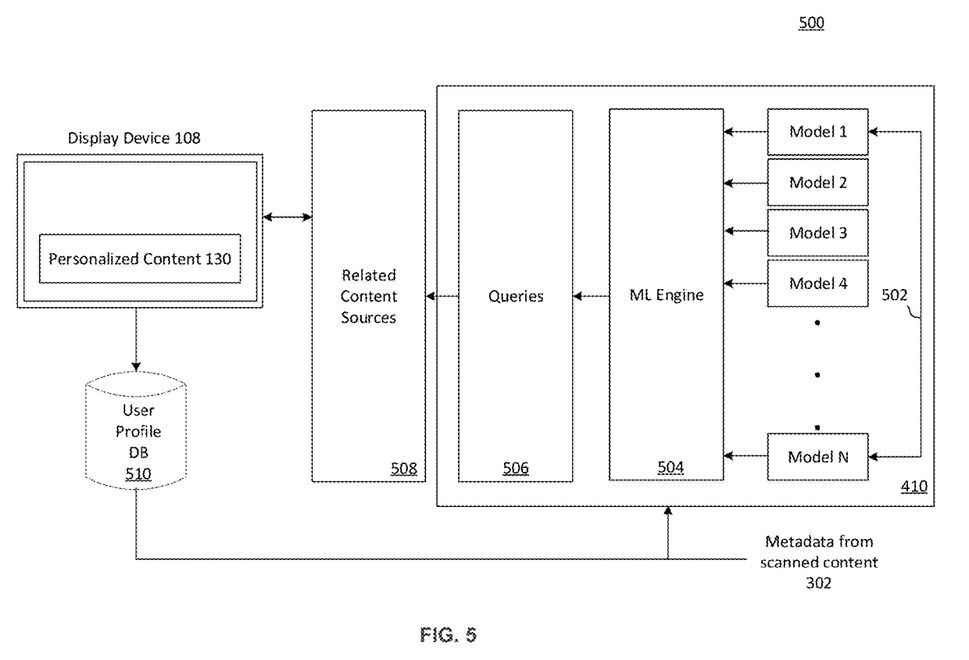
FIG. 5 illustrates another example diagram of a personalized content system, according to some aspects.

A profile ID from a user of the media device is paired with the metadata and communicated to the ML platform 410 to generate a query (e.g., AI query) to locate additional related content (e.g., as identified by a content identifier (ID)) that may be communicated back to the media device 106 through a user interface 404. The user's profile ID may be used to look up a pre-stored profile of historical interactions with content, preferences and interests. FIG. 5 will provide additional detail on ML platform 410 operations. The query is used as a search tool to discover additional related content based on the objects of interest and the user profile.

User interface 404 instantiates the related content on one or more user devices, such as a media device 106 or display device 108. The related content may be in any of the visual or aural formats previously described in FIG. 3 (e.g., video, audio, text, links, etc.). For the identified objects of interest in the content, a query is generated for the different user profiles (e.g., like in the above example for Historian and Tourist). When the viewer watches the content on his/her TV or Player (e.g., display device 108), the personalized content 130, based on the profile, is communicated through UI 404 to, for example, media device 106 at the appropriate time of the timestamp, resulting in personalized relevant info presented to the user most closely associated with a matched level of interest.

Related content backend 416 may be configured as a service that searches, using the generated queries, informational content on digital platforms. For example, related content backend 416 may be implemented as a Web server with the query implemented in a browser to search for content used in online sources (e.g., World Wide Web (WWW)). In some aspects, related content backend 416 may be implemented as a Web server that stores advertising content used in online marketing and delivers that content onto various digital platforms such as television and streaming devices. For example, using the earlier Egyptian example, travel agencies may add advertising for scheduling travel to Egypt (flights, hotels, local travel, etc.), event passes, travel restriction information, etc. In one aspect, a large language model (LLM), embodied by an artificial neural network, may be implemented to search for related content using massive parallel processing of vast amounts of unlabeled texts based on of tokens (i.e. parts of words), using self-supervised learning or semi-supervised learning, resulting in a tokenized vocabulary with a probability distribution. In an implicit way, LLMs acquire an embodied knowledge about syntax, semantics and "ontology" inherent in human language.

Related content server 406 may be configured as a service that places informational content on digital platforms. For example, related content server 406 may deliver video, imagery, audio, text as identified by a content identifier (ID) and delivered as content or links to that content through cloud front end 412. Cloud front end 412 may support cloud access for any of the personalized content system 400 components.

FIG. 5 illustrates another example diagram of a personalized content system 500, according to some aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 5, as will be understood by a person of ordinary skill in the art.

Personalized content system 500 may be implemented with a machine-learning platform, such as ML platform 410. Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning).

A machine-learning engine may use various classifiers to map concepts associated with a specific content structure to capture relationships between concepts (e.g., identifiable objects of interest) and the user's interests (e.g., as found in a user profile). The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify content watch patterns and associated future content selections within varying content structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of content recognition, a dataset of movies and genre matches may be used.

In some aspects, machine learning models are trained with other customer's historical information (e.g., previous personalized content provided). In addition, large training sets of the other customer's historical information may be used to normalize prediction data (e.g., not skewed by a single or few occurrences of a data artifact). Thereafter, the predictive models may classify a specific user's historic data based on a positive interaction with generated personalized content or by negative labels (e.g., no interaction, etc.) against the trained predictive model to predict preferences and generate or enhance a previous generated query based on a user profile and provided metadata. In one embodiment, the ML models (e.g., models 502, 1-N) are continuously updated as new user profile categories or objects of interest occur.

User profile DB 510 may provide user profile information that may be used with the ML platform 410 to provide account and profile information based on associated identifiers (IDs). Additionally, as specific personalized content 130 selections are presented to the user, for example, as overlays rendered on their display device 108, the historical information may be added to the user's profile and further be stored in the User Profile DB 510.

Metadata from scanned content 302, is derived either using Computer Vision (CV), AI, or manual labeling. In an AI aspect, a series of desired models 502, 1-N, may be fed into the ML Engine 504 as predictor models to select a model that may, based on a user's profile (e.g., categories) and the metadata from scanned content 302, generate a query (queries 506) that will search related content sources 508 for personized content to present to the user's device (e.g., display device 108). The predictor models seek to predict a model that will increase user interactions with the generated personalized content selections. Referring back to our previous example, "model 1" may be a first tourist model, while a "model 2" may be a second tourist model, "model 3" a third tourist model, etc. While described for one specific category (tourists), any number of categories and corresponding models may be generated. Alternatively, or in addition to, in some aspects, the models 502 may be implemented as a single model trained to produce a query for any category or metadata combination. For example, the single model may be an AI model (e.g., AI chatbot model).

The model(s) 502 may be trained and continuously improved by analyzing relative success over a large data set, where success is measured by a user's interactions with the returned personalized content. In one example aspect, using natural language processing, user profiles may be parsed and a model selected based on the parsed terms. For example, models 502 may be focused to generate queries for a specific category, such as tourism or history.

In some aspects, the ML engine may continuously change weighting of model inputs to increase user interactions with personalized content. For example, weighting of specific terms, phrases or equivalents may be continuously modified in the model to trend towards greater success. Conversely, term weighting that lowers successful user interactions may be lowered or eliminated.

The related content sources 508 may include, but is not limited to, any digital data source, such as, but not limited to, the content server(s) 120, content backend 414, content recommendation server 128, related content backend 416, and related content server 406 as previously described.

Figure 6:
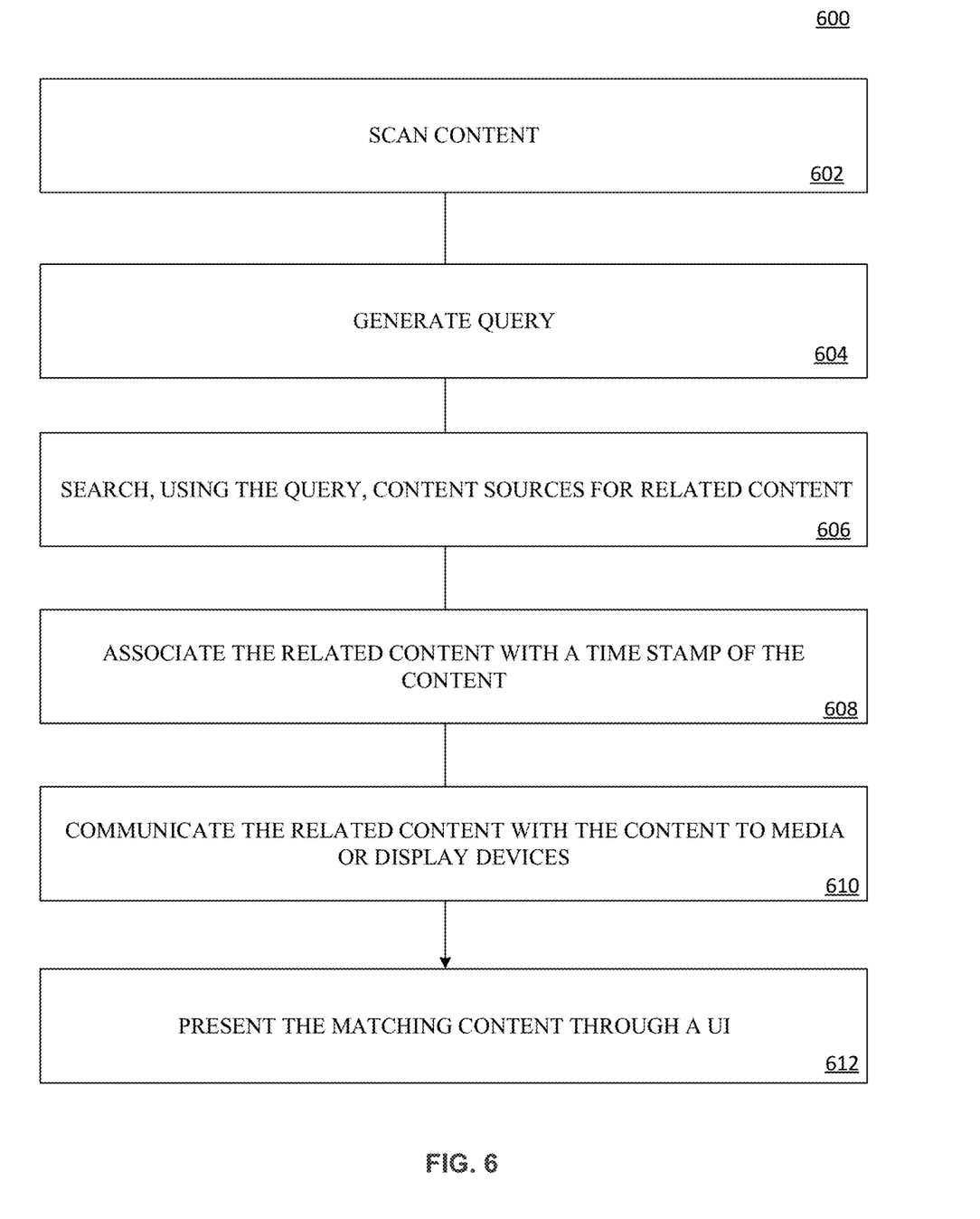
FIG. 6 illustrates a flow diagram for a personalized content system, according to some aspects.

FIG. 6 is a flow chart 600 depicting a personalized content method that can be carried out in line with the discussion above. One or more of the operations in the method depicted by FIG. 6 could be carried out by one or more entities, including, without limitation, system server 126, media system 104 or content server 120, and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations. In some aspects, the systems described generate and instantiate personalized content on streaming platforms.

In 602, system servers 126, initiates a search request for identifiable elements located within content by scanning content currently being stored, collected, transmitted, buffered, streamed, or presented on a content presentation device (e.g., display device 108). Scanning may include, but is not limited to, systems and algorithms, such as, ACR, AVOD, SVOP, OVP or OTT. Scanning identifies one or more identifiable objects of interest. For example, in the earlier described example, pyramids are discovered to be included in the content. While described for live content, in some aspects, scanning may occur during content creation, by content providers or by content recommendation server 128, in advance of a request for presentation. In some aspects, based on a user's profile, the scanning may be limited to scan for objects that are may be associated with a user's interest as noted in the user's profile. Even for live content, in some aspects, the technology disclosed herein may be processed by the backend, if a small window is available (e.g., 1-2 sec of lead-time).

In 604, system servers 126, based on the user profile and the metadata of one or more identified objects of interest, generate a query for a customized search for related content that would be of interest to the user, based on the user's profile. In various aspects, the query may be generated by a ML platform 410, an AI query, an AI chatbot, a natural language processor (not shown), etc.

In 606, system servers 126, implement the query to search content sources for related content. The content sources may include, any digital content or information sources, such as, but not limited to, content server 122, content backend 414, content recommendation server 128, related content backend 416, related content server 406, World Wide Web (WWW), as previously described.

In 608, system servers 126, associate the related content with a specific location within the content by adding a timestamp to content as metadata. For example, if the pyramids are displayed at the 20-minute mark, then the user is notified at that point that additional information or content is available for review.

In 610, system servers 126, communicate the related content to the user's device, such as media device 106 or display device 108. The related content may be buffered and transmitted together or separately with the streaming content.

In 612, the related content (e.g., personalized content 130) is instantiated through a UI on or to a media device 106 or display device 108. For example, the personalized content is displayed as a graphic overlay with or without matching audio of the content. The client then 'assembles' the related content so that the client can then render on screen or add as audio. The rendering may include imagery, text, or a link to additional related content. The UI may instantiate the personalized content as video, images, graphics, audio, etc.

Alternatively, or in addition to, one or more components of the personalized content system may be implemented within the media system 104, by third party platforms, a cloud-based system or distributed across multiple computer-based systems.

The solution described above marries several key technical components that are lacking in the current personalization aspect of OTT media streaming, broadcast television, cable TV systems. The various aspects solve at least the technical problem of making personalized content available for the various content distribution platforms described herein.

Example Computer System

Figure 7:
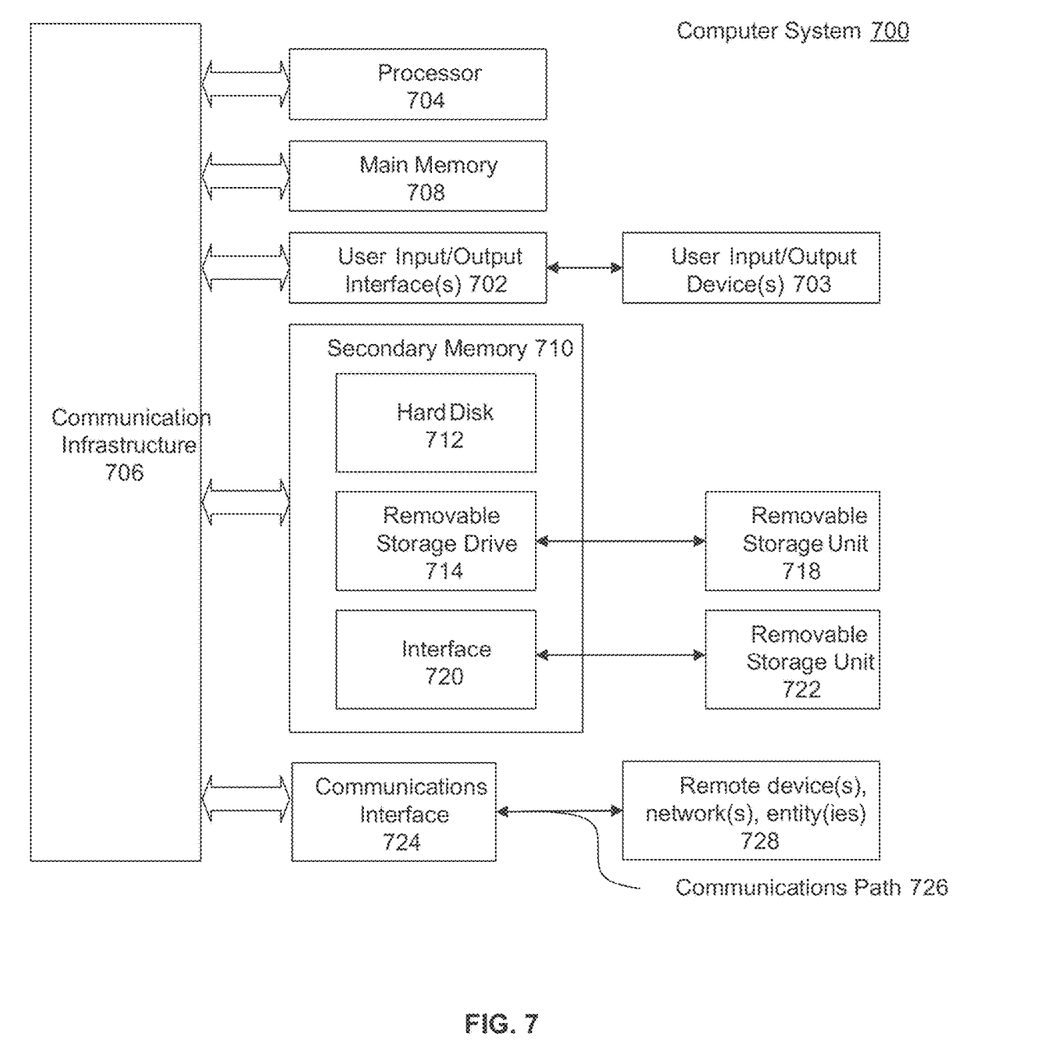
FIG. 7 illustrates an example computer system useful for implementing various aspects.

Various aspects may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the aspects discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 7. In particular, aspects can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer implemented method for generating personalized content, the method comprising:
  receiving a request for content for playback on a user device;
  scanning the content to identify objects of interest located within the content;
  generating a query based on the identified objects of interest and a user profile;
  searching, based on the query, content sources for related content;
  associating the related content with an occurrence of a corresponding identified object of interest within the content; and
  communicating, to the user device, the content and the related content for instantiation through a user interface (UI) of the user device.

2. The method of claim 1, wherein the request for content for the user device is based on recommended content from a recommended content system.

3. The method of claim 1, wherein the request for content originates in a streaming media device platform comprising an Over-the-Top (OTT) device.

4. The method of claim 1, further comprising:
  generating the query based on a model of a machine-learning platform, wherein inputs to the model comprise at least the identified objects of interest and the user profile.

5. The method of claim 1, further comprising:
  generating the query based on any of: artificial intelligence (AI), natural language processing, or an AI chatbot.

6. The method of claim 1, wherein the associating the related content with the occurrence of the corresponding identified object of interest within the content comprises:
  generating a timestamp for the occurrence, and
  wherein the timestamp is communicated to the user device with the content and the related content.

7. The method of claim 1, further comprising generating a user notification for notification during playback of the content that the related content is available for interaction on the user device.

8. The method of claim 1, wherein the instantiation through the UI of the user device further comprises generating any of: video, images, text, graphics, overlays, links, or audio.

9. A system, comprising:
  a memory; and
  at least one processor coupled to the memory and configured to perform operations comprising:
  receiving a request for content for playback on a user device;
  scanning the content to identify objects of interest located within the content;
  generating a query based on the identified objects of interest and a user profile;
  searching, based on the query, content sources for related content;
  associating the related content with an occurrence of a corresponding identified object of interest within the content; and
  communicating, to the user device, the content and the related content for instantiation through a user interface (UI) of the user device.

10. The system of claim 9, wherein the request for content for the user device is based on recommended content from a recommended content system.

11. The system of claim 9, wherein the request for content originates in a streaming media device platform comprising an Over-the-Top (OTT) device.

12. The system of claim 9, wherein the at least one processor is further configured to:
generate the query based on any of: machine-learning, artificial intelligence (AI), natural language processing, or an artificial intelligence chatbot.

13. The system of claim 9, wherein the at least one processor is further configured to:
generate a timestamp for the occurrence of the corresponding identified object of interest within the content; and
wherein the timestamp is communicated to the user device with the content and the related content.

14. The system of claim 9, wherein the at least one processor is further configured to: generate a notification for user notification during playback of the content that the related content is available for interaction on the user device.

15. The system of claim 9, wherein the instantiation through the UI of the user device further comprises generating any of: video, images, text, graphics, overlays, links, or audio.

16. A non-transitory computer-readable medium having instructions stored thereon that, when executed by at least one computing device, cause the at least one computing device to perform operations comprising:
receiving a request for content for playback on a user device;
scanning the content to identify objects of interest located within the content;
generating a query based on the identified objects of interest and a user profile;
searching, based on the query, content sources for related content;
associating the related content with an occurrence of a corresponding identified object of interest within the content; and
communicating, to the user device, the content and the related content for instantiation through a user interface (UI) of the user device.

17. The non-transitory computer-readable medium of claim 16, wherein the request for content is generated from an Over-the-Top (OTT) device.

18. The non-transitory computer-readable medium of claim 16, the operations further comprising:
generating the query based on any of: machine-learning, artificial intelligence (AI), natural language processing, or an artificial intelligence chatbot.

19. The non-transitory computer-readable medium of claim 16, the operations further comprising:
generating a timestamp for the occurrence of the corresponding identified object of interest within the content; and
wherein the timestamp is communicated to the user device with the content and the related content.

20. The non-transitory computer-readable medium of claim 16, the operations further comprising:
generating a notification for user notification during playback of the content that the related content is available for interaction on the user device.

\* \* \* \* \*